United States Patent
Kamiya

(10) Patent No.: US 8,025,042 B2
(45) Date of Patent: Sep. 27, 2011

(54) INTAKE FLOW CONTROL DEVICE FOR INTERNAL COMBUSTION ENGINE

(75) Inventor: Akihiro Kamiya, Takahama (JP)

(73) Assignee: Denso Corporation, Kariya (JP)

( * ) Notice: Subject to any disclaimer, the term of this patent is extended or adjusted under 35 U.S.C. 154(b) by 244 days.

(21) Appl. No.: 12/407,963

(22) Filed: Mar. 20, 2009

(65) Prior Publication Data

US 2009/0235891 A1   Sep. 24, 2009

(30) Foreign Application Priority Data

Mar. 21, 2008   (JP) .................................. 2008-072983

(51) Int. Cl.
 *F02D 9/10* (2006.01)
(52) U.S. Cl. ......... 123/336; 123/337; 123/306; 123/308
(58) Field of Classification Search .................. 123/306, 123/308, 336, 337, 188.14
See application file for complete search history.

(56) References Cited

U.S. PATENT DOCUMENTS

| | | | | |
|---|---|---|---|---|
| 4,240,387 A | * | 12/1980 | Motosugi et al. | 123/184.45 |
| 4,320,725 A | * | 3/1982 | Rychlik et al. | 123/188.14 |
| 4,413,598 A | * | 11/1983 | Tsutsumi | 123/306 |
| 4,704,996 A | * | 11/1987 | Morikawa | 123/188.14 |
| 5,671,712 A | * | 9/1997 | Uchida | 123/308 |
| 6,827,060 B2 | * | 12/2004 | Huh | 123/336 |
| 7,409,944 B2 | * | 8/2008 | Tsuchiya | 123/337 |
| 7,448,357 B2 | * | 11/2008 | Dudek | 123/336 |
| 7,455,044 B2 | * | 11/2008 | Isaji et al. | 123/308 |
| 7,637,244 B2 | * | 12/2009 | Akazaki et al. | 123/337 |
| 2004/0237931 A1 | * | 12/2004 | Okamoto et al. | 123/308 |
| 2007/0144483 A1 | | 6/2007 | Torii et al. | |
| 2007/0181097 A1 | * | 8/2007 | Torii et al. | 123/306 |

FOREIGN PATENT DOCUMENTS

JP   2008-038816   2/2008

OTHER PUBLICATIONS

Japanese Office Action Jun. 21, 2011 issued in corresponding Japanese Application No. 2008-072983 with English translation.

* cited by examiner

*Primary Examiner* — Erick Solis
(74) *Attorney, Agent, or Firm* — Nixon & Vanderhye PC

(57) ABSTRACT

An intake flow control device includes valve units, a drive shaft, and an actuator. The valve unit includes a housing defining an intake passage therein. A valve shaft is supported between side walls of the housing. The drive shaft connects and drives the valve shafts. The actuator is directly connected to the drive shaft so as to drive a valve mounted to the valve shaft to open or close the intake passage. The valve has a width defined between side ends of the valve, which is larger than a width defined between side walls of the intake passage located at an upstream side of the valve.

10 Claims, 7 Drawing Sheets

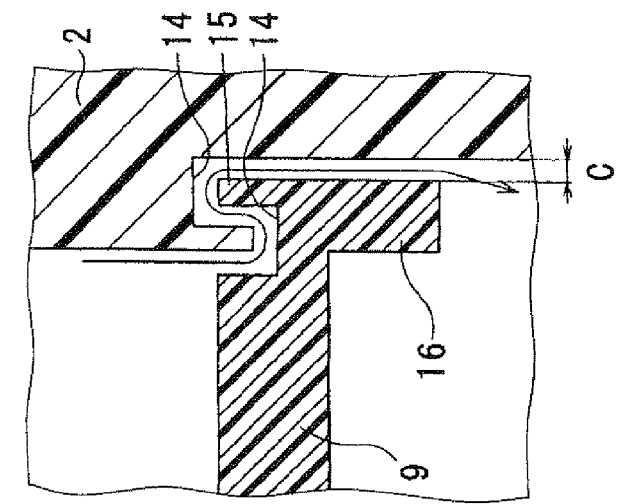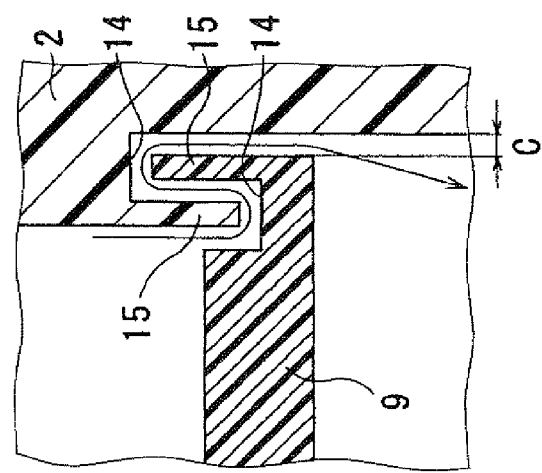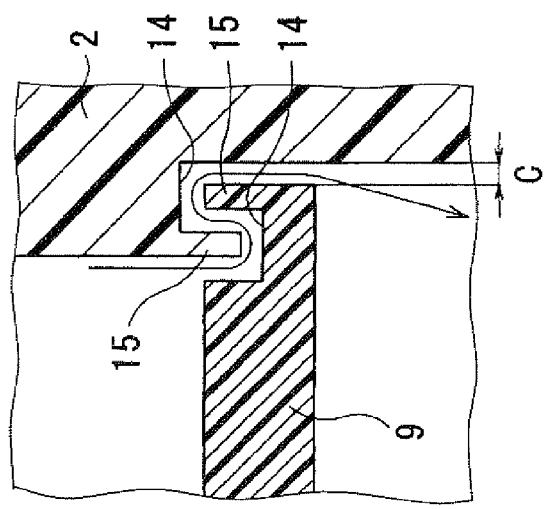

INTAKE FLOW CONTROL DEVICE FOR INTERNAL COMBUSTION ENGINE

CROSS REFERENCE TO RELATED APPLICATION

This application is based on Japanese Patent Application No. 2008-72983 filed on Mar. 21, 2008, the disclosure of which is incorporated herein by reference in its entirety.

BACKGROUND OF THE INVENTION

1. Field of the Invention

The present invention relates to an intake flow control device having a valve unit for changing intake flow so as to switch air flow formed in a combustion chamber of an internal combustion engine.

2. Description of Related Art

As shown in FIG. 6, an intake flow control device 100 includes an intake manifold 102 defining an intake passage 103 therein. A valve unit 104 is arranged in the intake passage 103 to change intake flow. Air flow to be formed in a combustion chamber 111 of an internal combustion engine 112 is changed by controlling the valve unit 104 to open or close the intake passage 103.

When the engine 112 is cool, or when the amount of intake air is small, the valve unit 104 totally closes the intake passage 103 so as to generate a tumble flow in response to a control signal output from an electronic control unit (ECU, not shown) of the engine 112. A turbulence generated in the combustion chamber 111 is enhanced so as to homogenize a fuel-air mixture. A combustion generated in the combustion chamber 111 is improved so as to increase combustion efficiency and decrease emission of exhaust gas.

In contrast, when the engine 112 is warm, a large amount of intake air is necessary. In this case, the valve unit 104 totally opens the intake passage 103 so as to stop generating the tumble flow. Thus, all intake air is made to pass through the intake passage 103.

As shown in FIGS. 7A and 7B, JP-A-2007-170340 (corresponding to US 2007/0144483 A1) discloses an intake flow control device having a valve unit 104 constructed with a valve 109, a valve shaft 105, and a housing 108. The valve 109 is rotatably arranged in an intake passage 103 so as to generate a tumble flow to be supplied into a combustion chamber. The intake passage 103 is closed by the valve 109 so as to decrease a cross-sectional area of the intake passage 103. The tumble flow is generated by opening or closing the valve 109.

The valve 109 is mainly made of resin, and is integrally connected to the valve shaft 105. The valve 109 is a swing-type valve, and the valve shaft 105 is supported by two side walls of the housing 108 defining the intake passage 103 therein. When the valve 109 closes the intake passage 103, the valve 109 is approximately perpendicular to the intake passage 103.

The housing 108 has an outer wall, which is held in an intake manifold 102 through a floating gasket 110. Thus, thermal deformation of the housing 108 due to a temperature change can be absorbed by the floating gasket 110. The valve 109 and the housing 108 oppose to each other with a predetermined side clearance C. Intake flow is separated into a main flow M and a bypass flow B at the valve unit 104. The amount of the bypass flow B is determined by the side clearance C. The tumble flow can be easily generated by controlling the side clearance C, and the amount of the main flow M can be maintained by controlling the side clearance C.

The valve unit 104 is inserted into each branch tube of the intake manifold 102. The number of the valve units 104 corresponds to the number of cylinders of the engine. A drive shaft having a rectangular cross-section penetrates and connects the valve shafts 105 of the valve units 104, which are arranged in a line. An actuator is directly connected to the drive shaft. The valve unit 104 can be driven to open or close the intake passage 103 due to the drive shaft and the actuator.

When the valve unit 104 totally closes the intake passage 103, intake air is contracted by the valve unit 104. A flowing area of the contracted air is set to be small so as to generate a high tumble flow. A speed of the contracted air becomes fast, and a turbulence is enhanced so that the high tumble flow can be generated. However, if air flowing in the intake passage 103 is more contracted, a flow loss is increased when the valve unit 104 totally closes the intake passage 103. Further, the bypass flow B flowing through the side clearance C is increased, because the flow loss is increased. Furthermore, the amount of the main flow M may be decreased. Thereby, the high tumble flow cannot be increased.

The side clearance C is made small so as to secure the generation of the high tumble flow. Thus, the amount of bypass flow B is decreased, and a predetermined amount of main flow M is secured. However, the floating gasket 110 absorbing the thermal deformation of the housing 108 is required so as to prevent a break of the valve 109 when the side clearance C is made small. In this case, cost may be increased because the floating gasket 110 is additionally needed.

The housing 108 of the valve unit 104 is supported by the floating gasket 110. When a pulsing of air flow is generated in the intake passage 103, the housing 108 may be rotated in a condition that the valve shaft 105 is a center of the rotation. In this case, the valve unit 104 may contact with other parts with slapping sound. When an additional construction change or a sound-absorbing material is needed for reducing the slapping sound, a cost of producing the intake flow control device may be increased.

Further, the valve 109 may contact the housing 108 due to a thermal deformation or a time-lapse deposit adherence. When the valve 109 contacts the housing 108, the valve 109 cannot smoothly rotate. Further, the rotation of the valve 109 may be stopped. In this case, a drive torque of the actuator may be increased, such that a size of the actuator needs to be increased. Thus, the cost of producing the intake flow control device may further be increased.

If the side clearance C is made large, the break of the valve 109 and the contact between the valve 109 and the housing 108 due to the time-lapse deposit adherence can be prevented. Further, the floating gasket 110, and the increasing of the size of the actuator are not needed, such that the cost of producing the intake flow control device may not be increased.

Furthermore, a predetermined amount of the main flow M and the high tumble flow are required to be maintained without the increasing of the bypass flow B, even if the side clearance C is made large.

SUMMARY OF THE INVENTION

In view of the foregoing and other problems, it is an object of the present invention to provide an intake flow control device.

According to a first example of the present invention, an intake flow control device for an internal combustion engine includes a plurality of valve units for changing intake flow, a drive shaft, and an actuator. The valve unit includes a tubular housing defining an intake passage therein, a valve shaft, and a valve. The housing is disposed in an intake manifold such that an outer face of the housing is contact with an inner face of the intake manifold. The valve shaft is supported between side walls of the housing. The valve mounted to the valve shaft opens or closes the intake passage. The drive shaft connects the valve shafts of the valve units to rotatably drive the valve shaft. The actuator is directly connected to the drive shaft so as to drive the valve units to open or close. The valve has a width defined between side ends of the valve, which is larger than a width defined between side walls of the intake passage located at an upstream side of the valve.

Accordingly, a predetermined amount of main flow and a high tumble flow can be secured.

According to a second example of the present invention, an intake flow control device for an internal combustion engine includes a plurality of valve units to change intake flow. The valve unit includes a valve shaft supported between side walls of an intake passage of an intake manifold, and a valve mounted to the valve shaft so as to open or close the intake passage. The intake flow control device further includes a drive shaft connecting the valve shafts of the valve units so as to rotatably drive the valve shaft, and an actuator directly connected to the drive shaft so as to drive the valve units to open or close. The valve has a width defined between side ends of the valve, which is larger than a width defined between side walls of the intake passage located at an upstream side of the valve.

Accordingly, a predetermined amount of main flow and a high tumble flow can be secured.

BRIEF DESCRIPTION OF THE DRAWINGS

The above and other objects, features and advantages of the present invention will become more apparent from the following detailed description made with reference to the accompanying drawings. In the drawings:

FIG. 5A is an enlarged view showing a first modification of the second embodiment, FIG. 5B is an enlarged view showing a second modification of the second embodiment, and FIG. 5C is an enlarged view showing a third modification of the second embodiment;

DETAILED DESCRIPTION OF PREFERRED EMBODIMENT

First Embodiment

Figure 1:
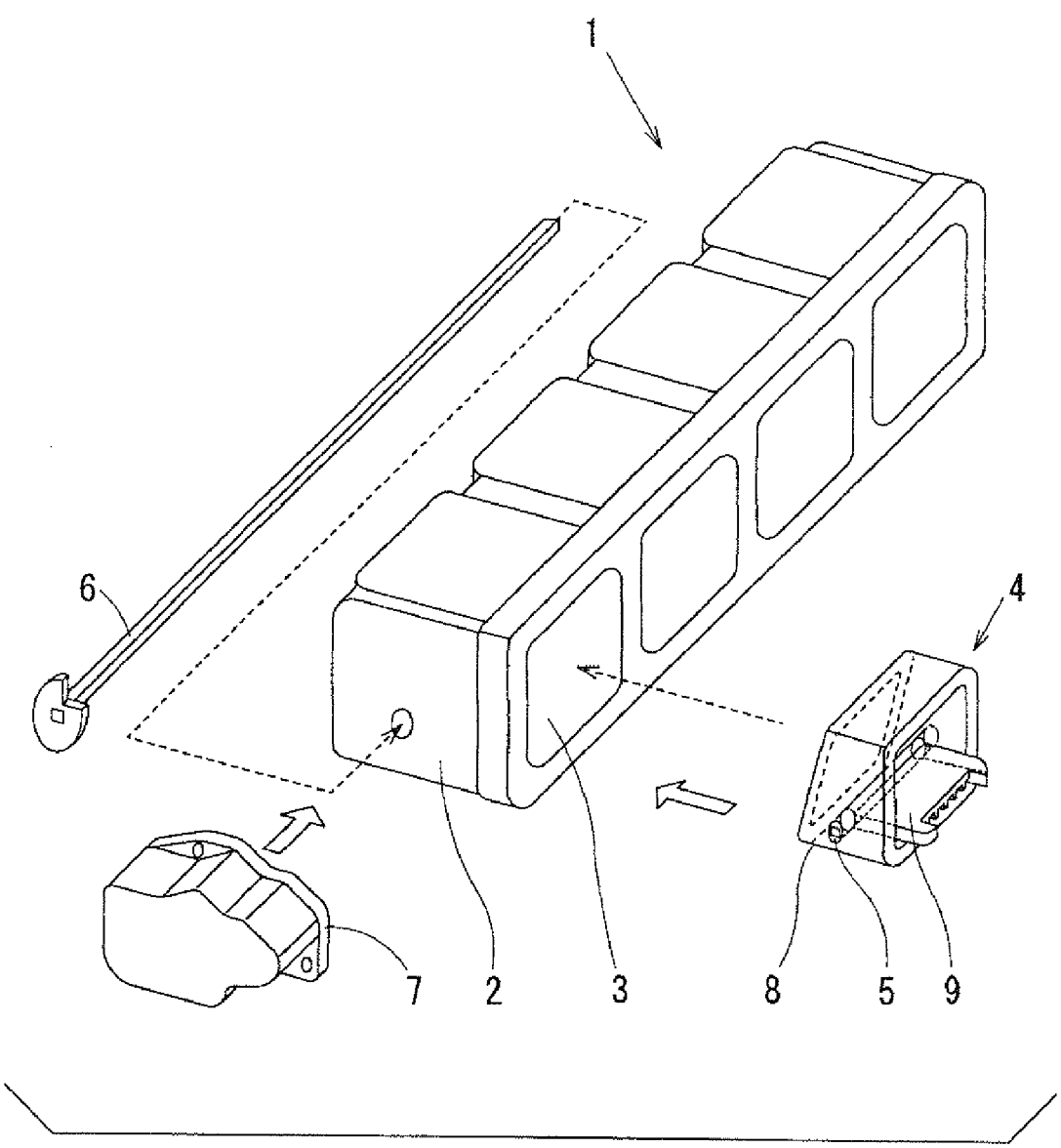
FIG. 1 is an exploded view showing an intake flow control device according to a first embodiment.

An intake flow control device 1 shown in FIG. 1 is used in a multi-cylindered internal combustion engine (not shown) mounted on an automotive vehicle, for example. The multi-cylindered internal combustion engine is a four-cylindered gasoline engine, for example. The engine includes an intake manifold 2 having an intake passage 3, and a valve unit 4 for changing intake flow is arranged in the intake passage 3. A tumble flow is generated in air to be supplied to a combustion chamber of the engine by opening or closing the valve unit 4.

As shown in FIG. 1, the intake flow control device 1 includes the valve unit 4, a drive pin shaft 6, and an actuator 7. The valve unit 4 is arranged in the intake passage 3 of the intake manifold 2 of the engine, and changes intake flow. The intake manifold 2 has plural intake passages 3, and the valve unit 4 is disposed in each of the intake passages 3. The drive pin shaft 6 connects valve shafts 5 of the valve units 4 in a shaft direction, and drives the valve shaft 5 to rotate. The drive pin shaft 6 has a rectangular cross-section. The actuator 7 drives the drive pin shaft 6 to open or close in a predetermined angle range. The intake flow control device 1 opens or closes the valve unit 4 in response to a control signal output from an electric control unit (ECU, not shown) so as to change air flow supplied to the combustion chamber.

Figure 2A:
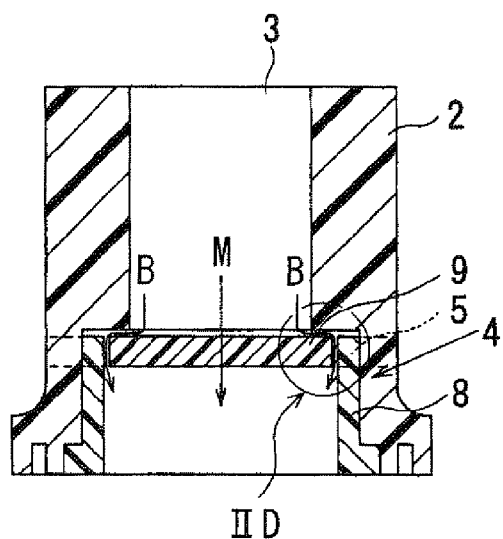
FIG. 2A is a cross-sectional view showing a top face of a valve unit of the intake flow control device.
Figure 2B:
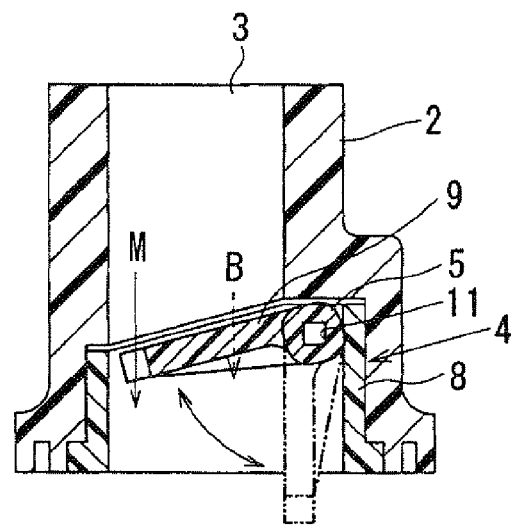
FIG. 2B is a cross-sectional view showing a side face of the valve unit.

As shown in FIGS. 2A and 2B, the valve unit 4 includes a housing 8, the valve shaft 5, and a valve 9. The valve shaft 5 is supported by the housing 8. The valve 9 is integrally connected to the valve shaft 5, and is rotatably opened or closed. The valve 9 has a swing structure, for example.

The housing 8 is made of resin, and has a structural wall having an approximately rectangular tube shape, for example. The wall of the housing 8 corresponds to an inner wall of the intake passage 3 of the intake manifold 2. The intake passage 3 is defined inside of the housing 8. As shown in a dashed line of FIG. 2A, the housing 8 has a pair of shaft holes for supporting ends of the valve shaft 5 at a lower position of left-and-right side walls. The housing 8 has a predetermined dimension in a longitudinal direction parallel to the intake passage 3. An upstream-side end face of the housing 8 has an inclined angle relative to the longitudinal direction of the housing 8, which corresponds to a valve-closing angle of the valve 9. A downstream-side end face of the housing 8 is perpendicular to the longitudinal direction of the housing 8.

As shown in FIG. 2B, the valve shaft 5 is integrally connected to the valve 9 so as to drive the valve 9 to open or close the intake passage 3. The valve shaft 5 is a round bar made of resin. A rectangular hole 11 penetrates a rotation center of the valve shaft 5 to drive the valve shaft 5. Because a rectangular shape of the rectangular hole 11 corresponds to a shape of the cross-section of the drive pin shaft 6, the rectangular hole 11 and the drive pin shaft 6 are engaged with each other.

The valve shaft 5 is supported through the shaft holes located at the lower position of the left-and-right side walls of the housing 8. The valve shaft 5 extends in a direction approximately perpendicular to a flowing direction of intake flow flowing through the intake passage 3. Therefore, the valve 9 integrated with the valve shaft 5 opposes to intake air flowing in the intake passage 3. The valve 9 rotates, and a center of the rotation is the valve shaft 5, which extends perpendicularly to a flowing direction of intake air. The valve 9 is rotated to totally open or close the intake passage 3.

Figure 2C:
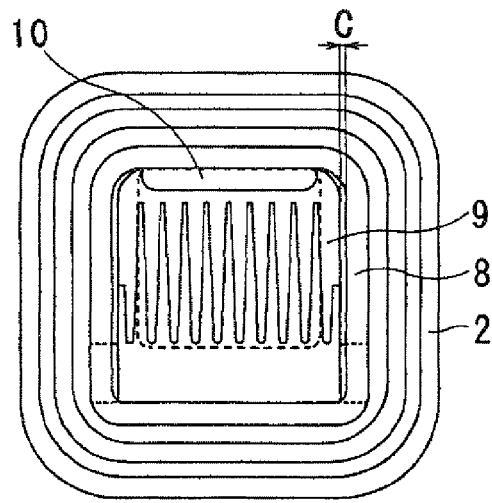
FIG. 2C is an elevation view showing the valve unit.

As shown in FIG. 2C, the valve 9 is a board having an approximately rectangular shape, and an end of the valve 9 has a round part. A center of the round part of the valve 9 is cut so as to be defined as an opening 10. Further, a separation wall having a rib shape is arranged at each end of the opening 10, such that rigidity and strength of the valve 9 can be secured.

When the valve 9 totally closes the intake passage 3, the opening 10 is a main passage in which a tumble flow is generated. The main passage is defined by the valve 9 and the housing 8. Thus, a cross-sectional area of the main passage is contracted When intake air flowing through the intake passage 3 at an upstream side of the valve 9 passes through the main passage, a main flow B is generated by contracting the intake air with a gained momentum. Thus, air flow to be introduced into the combustion chamber can have the tumble flow. In contrast, when the valve 9 totally opens the intake passage 3, intake air is not contracted so that the tumble flow is not generated. A large amount of air passes through the intake passage 3, which is totally opened.

A left-and-right side end of the valve 9 is defined as a valve side. A side clearance C having a predetermined dimension is defined between the side end of the valve 9 and the side wall of the housing 8. The side clearance C is set to have a predetermined dimension so as to prevent a break of the valve 9, if a thermal deformation is generated by a temperature change. Therefore, intake air flowing at an upstream side of the valve 9 passes through the side clearance C as a bypass flow B when the intake passage 3 is totally closed by the valve 9. Intake air is separated into the main flow M and the bypass flow B at the valve 9 when the intake passage 3 is totally closed by the valve 9. When the bypass flow B is increased, the main flow M is decreased, such that the generation of the tumble flow is decreased. The decreasing of the tumble flow depends on a strength and a speed of the main flow M.

The tumble flow is introduced into the combustion chamber by totally closing the intake passage 3 with the valve unit 4. The valve unit 4 is not limited to a cantilever type swing valve. The valve unit 4 may be a butterfly valve, which is supported by both sides, for example. The opening 10 of the valve 9 is used for defining the main passage between the valve 9 and the housing 8, and the cross-sectional area of the main passage is decreased when the valve unit 4 totally closes the intake passage 3. The opening 10 is formed by notching. However, the formation of the opening 10 is not limited to the notching. The opening 10 may have another shape without the notching. The valve shaft 5 and the valve 9 may be integrated with each other. When the valve shaft 5 and the valve 9 are separated from each other, a connecting member such as a screw may connect the valve shaft 5 and the valve 9.

As shown in FIG. 1, the valve unit 4 is fixed inside of the intake passage 3 of the intake manifold 2. The number of the valve units 4 corresponds to the number of the cylinders of the engine. In this embodiment, the number of the valve units 4 is four, for example. The valve shaft 5 extends in a direction approximately perpendicular to a flowing direction of intake air flowing in the intake passage 3. The drive pin shaft 6 having the rectangular cross-section connects the valve shafts 5 so as to drive the valve shafts 5 to rotate. The actuator 7 is directly connected to the drive pin shaft 6 to drive the valve 9 in an opening direction or a closing direction. The intake flow control device 1 is constructed by assembling the valve units 4, the drive pin shaft 6, and the actuator 7. The actuator 7 is activated by a control signal output from an electronic control unit (ECU, not shown), for example. Each air flow in the combustion chamber of the cylinder is changed by changing the valve unit 4 to open or close.

Figure 2D:
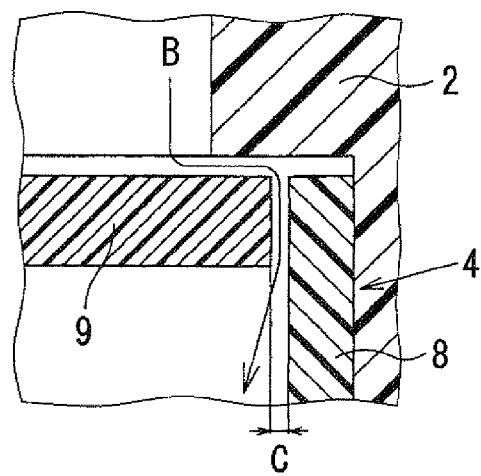
FIG. 2D is an enlarged view of FIG. 2A.

As shown in FIG. 2D, the side clearance C between the side end of the valve 9 and the housing 8 is made relatively large. A width defined between left-and-right side ends of the valve 9 is made larger than a width defined between left-and-right side walls of the intake manifold 2 located at an upstream side of the valve 9. Here, a size of the side clearance C is determined based on a maximum thermal deformation amount due to a temperature difference, a maximum time-lapse deposit adherence amount, and an appropriate additional clearance. That is, the size of the side clearance C is rationally set by combining the maximum thermal deformation amount and the maximum time-lapse deposit adherence amount and adding the appropriate additional clearance.

Thus, as shown in an arrow direction of FIG. 2D, when the valve 9 totally closes the intake passage 3, the bypass flow B turns with a right angle around the valve 9. Then, the bypass flow B passes through a clearance between the valve 9 and the intake manifold 2, which are contact with or adjacent to each other. Then, the bypass flow B again turns with a right angle to pass through the side clearance C between the valve 9 and the housing 8. Thus, the bypass flow B reaches the downstream side of the valve unit 4, as shown in the arrow direction of FIG. 2D.

The amount of bypass flow B can be decreased due to an increasing flow loss. The flow loss is a sum of a turning loss and a friction loss. The bypass flow B has two turning losses, and the friction loss is generated by a relatively long flow path, in spite of a relatively large width of the flow path. Thus, the main flow M can be increased, because the bypass flow B is decreased. Accordingly, a high tumble flow can be easily generated.

Operation of the intake flow control device 1 will be described with reference to FIGS. 1-2D. When the engine is activated, intake air passes inside of the intake passage 3. At this time, when the engine is cool, or when the amount of intake air is small, the actuator 7 is activated such that the valve unit 4 is closed by a control signal output from the ECU. When the valve unit 4 closes the intake passage 3, intake air passing through the main passage of the valve unit 4 is contracted. Thus, a momentum of the contracted air is increased, such that the tumble flow is introduced into the combustion chamber.

At this time, because the flow loss is increased, the bypass flow B flowing through the side clearance C is decreased. Therefore, the main flow M is increased, and the high tumble flow can be generated.

When the engine becomes warm, or when the amount of intake air is large, the tumble flow is not necessary. At this time, the valve unit 4 is opened so as to stop generating the tumble flow to be introduced into the combustion chamber. The large amount of intake air is introduced into the combustion chamber.

According to the first embodiment, the intake flow control device 1 includes the valve units 4 for changing intake flow, the drive shaft 6, and the actuator 7. The valve unit 4 includes the tubular housing 8 defining the intake passage 3 therein, the valve shaft 5, and the valve 9. The housing 8 is disposed in the intake manifold 2 such that an outer face of the housing 8 is contact with an inner face of the intake manifold 2. The valve shaft 5 is supported between left-and-right side walls of the housing 8. The valve 9 mounted to the valve shaft 5 opens or closes the intake passage 3. The drive shaft 6 connects the valve shafts 5 of the valve units 4 to rotatably drive the valve shaft 5. The actuator 7 is directly connected to the drive shaft 6 so as to drive the valve units 4 to open or close. The valve 9 has a width defined between left-and-right side ends of the valve 9, which is larger than a width defined between left-and-right side walls of the intake passage 3 of the intake manifold 2 located at an upstream side of the valve 9.

Therefore, even if the side clearance C between the valve 9 and the housing 8 is set relatively large, the amount of the bypass flow B is decreased, because the flow loss composed of the turning loss and the friction loss is increased. Accordingly, the amount of the main flow M can be increased, such that the high tumble flow can be easily generated.

Further, when the side clearance C is set relatively large, the break of the valve 9 due to the thermal deformation and the time-lapse deposit adherence can be reduced. Therefore, a floating gasket, a measure for reducing a slapping sound, and an increasing of a torque or size of the actuator 7 are not needed. Accordingly, cost of producing the intake flow control device 1 can be decreased.

Figure 3C:
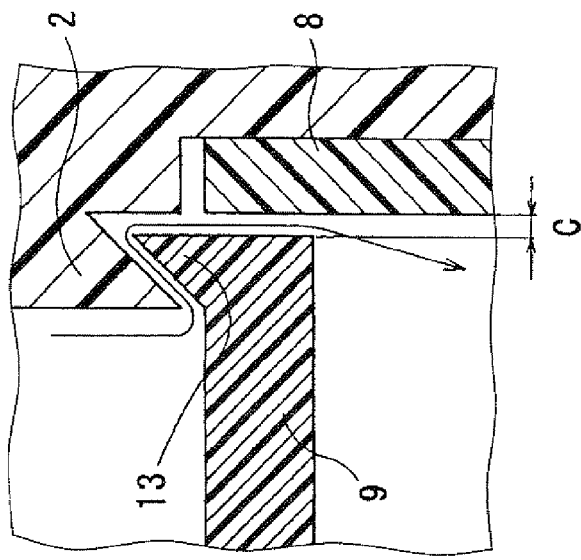
FIG. 3C is an enlarged view showing a third modification of the first embodiment.
Figure 3B:
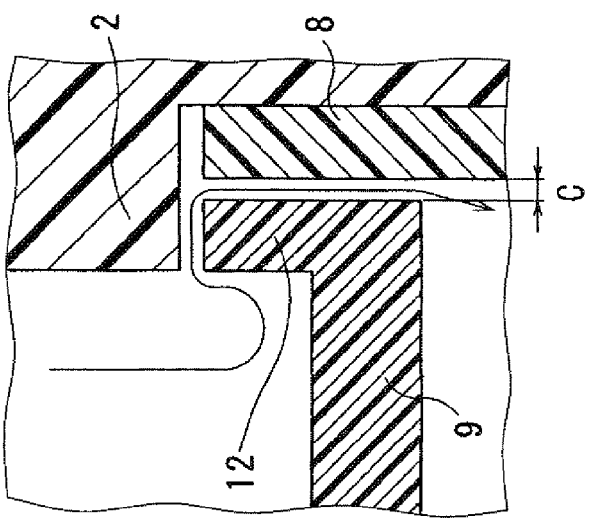
FIG. 3B is an enlarged view showing a second modification of the first embodiment.
Figure 3A:
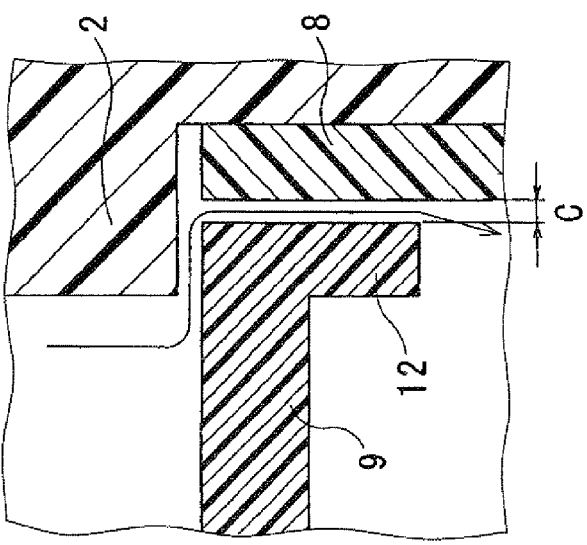
FIG. 3A is an enlarged view showing a first modification of the first embodiment.

A first modification of the first embodiment will be described with reference to FIG. 3A. The valve 9 of the first embodiment has a constant thickness. In contrast, the side end of the valve 9 may be thicker than other part of the valve 9. Thus, a flow path of the bypass flow B flowing through the side clearance C can be long, such that the friction loss of the flow loss can be increased. As shown in FIG. 3A, the side end of the valve 9 has a rib 12 extending toward the downstream side. The rib 12 has approximately the same thickness as the valve 9. That is, the side end of the valve 9 has twice as thick as other part of the valve 9. Therefore, the flow path of the bypass flow B of the first modification is approximately twice as long as that of the first embodiment. Thereby, the friction loss of the flow loss is increased, such that the amount of the bypass flow B is decreased.

A second modification of the first embodiment will be described with reference to FIG. 3B. The side end of the valve 9 has a rib 12 extending toward the upstream side. The rib 12 has approximately the same thickness as the valve 9. That is, the side end of the valve 9 has twice as thick as other part of the valve 9. Therefore, the flow path of the bypass flow B of the second modification is approximately twice as long as that of the first embodiment. Thereby, the friction loss is increased. Further, the bypass flow B impacts with the valve 9, and turns backward around the rib 12 to flow toward the downstream side. Therefore, an impact loss of the flow loss is increased, such that the amount of the bypass flow B can be reduced.

Here, a dimension of the rib 12 is not limited. A rigidity or strength of the valve 9 is enhanced due to the rib 12. Further, endurance for the thermal deformation, and a control accuracy of the valve 9 are improved. Therefore, appropriate dimension of the rib 12 may be set in consideration of these effects.

A third modification of the first embodiment will be described with reference to FIG. 3C. The rib 12 of the first and second modifications extends in a thickness direction of the valve 9. In contrast, the side end of the valve 9 may have a triangle shape. Thus, a flowing direction of the bypass flow B is changed with an acute angle smaller than 90° such that the flow loss is increased. As shown in FIG. 3C, the side end of the valve 9 has a rib 13 having a triangle cross-section at the upstream side. The intake manifold 2 opposing to the rib 13 of the valve 9 has a receiving face, which has a shape corresponding to the shape of the rib 13 having the triangle shape. That is, the side end of the valve 9 and the side wall of the intake manifold 2 oppose to each other at each adjacent face, and adjacent faces of the side end of the valve 9 and the side wall of the intake manifold 12 have shapes corresponding to each other. The bypass flow B flows through a clearance defined between the valve 9 and the intake manifold 2, so as to twice turn with an acute angle toward the downstream side.

Thereby, the flow loss is increased, because the turning loss is increased due to the twice turning with the acute angle. Accordingly, the amount of the bypass flow B can be reduced Second Embodiment A second embodiment will be described with reference to FIGS. 4A, 4B, 4C, and 4D. A valve unit 4 of the second embodiment is disposed on an intake manifold 2 without the housing 8 of the first embodiment.

In the first embodiment, the valve unit 4 for changing the intake flow includes the housing 8. The valve shaft 5 is rotatably supported between the left-and-right walls of the housing 8, and is integrated with the valve 9. The valve unit 4 is mounted to each branch tube of the intake manifold 2, and the drive pin shaft 6 traversely connects the valve units 4. The drive pin shaft 6 is directly driven by the actuator 7.

In the second embodiment, the valve shaft 5 is directly supported between left-and-right walls of the intake manifold 2 defining the intake passage 3 therein, without the housing 8. The wall of the intake manifold 2 has a shaft hole to which the valve shaft 5 is mounted. According to the second embodiment, construction of the intake flow control device 1 is simple, so that a cost of producing the device 1 can be reduced. Further, a slapping sound generated by rotation of the housing 8 having a floating structure is not generated. Detail specification of a part similar to the first embodiment will be omitted.

Figure 4A:
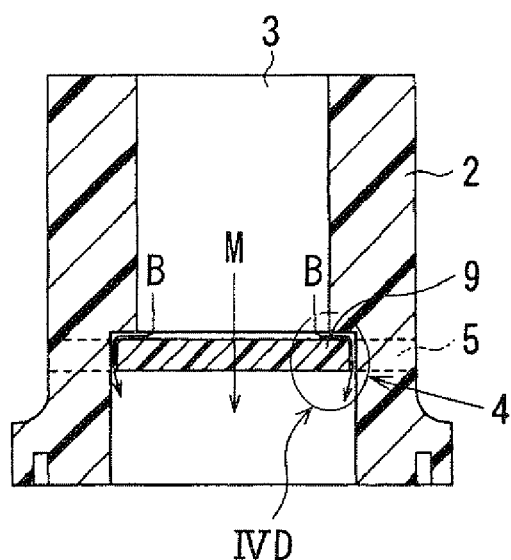
FIG. 4A is a cross-sectional view showing a top face of a valve unit of an intake flow control device according to a second embodiment.
Figure 4B:
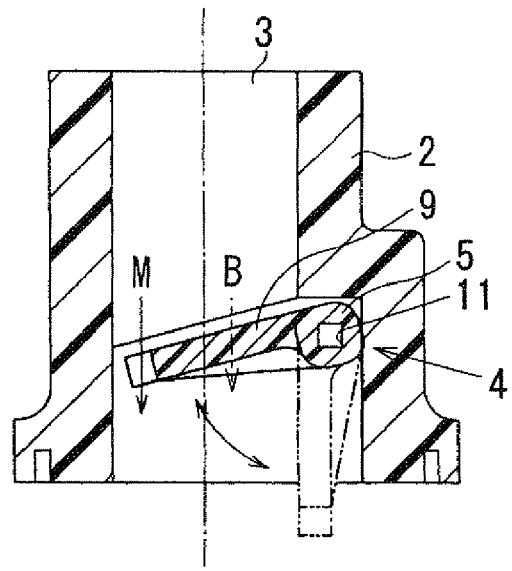
FIG. 4B is a cross-sectional view showing a side face of the valve unit.

As shown in a dashed line of FIG. 4A and FIG. 4B, the intake manifold 2 has a pair of shaft holes for supporting ends of the valve shaft 5 at a lower position of left-and-right side walls. The valve unit 4 includes the valve shaft 5 supported by the shaft holes, and the valve 9 integrated with the valve shaft 5. The valve 9 is a swing type valve, for example, and is rotatably opened or closed.

The intake manifold 2 is made of resin, and has a structural wall having an approximately rectangular tube shape, for example. The intake passage 3 is defined inside of the intake manifold 2. The intake manifold 2 has the pair of shaft holes for supporting the ends of the valve shaft 5 at the lower position of the left-and-right side walls. The valve shaft 5 is rotated in a condition that a center of the rotation is the shaft holes. When the valve 9 integrated with the valve shaft 5 is totally closed, the intake manifold 2 has an inclined angle corresponding to a closing angle of the valve 9.

Further, the intake manifold 2 has a step face such that a width between left-and-right side walls of the intake manifold 2 at the downstream side of the valve 9 is larger than that at the upstream side of the valve 9. The valve 9 has a width between left-and-right side ends, which is larger than a width between left-and-right side walls of the intake manifold 2 located at the upstream side of the valve 9. When the valve 9 is mounted to the intake manifold 2, and when the valve 9 is totally closed, an upstream face of the valve 9 is contact with the step face of the intake manifold 2. Alternatively, the upstream face of the valve 9 may be adjacent to the step face of the intake manifold 2 through a predetermined clearance.

The valve shaft 5 is integrally connected to the valve 9 so as to drive the valve 9 to open or close the intake passage 3. The valve shaft 5 is a round bar made of resin. A rectangular hole 11 penetrates a rotation center of the valve shaft 5 to drive the valve shaft 5. Because a rectangular shape of the rectangular hole 11 corresponds to a shape of the cross-section of the drive pin shaft 6, the rectangular hole 11 and the drive pin shaft 6 are engaged with each other.

The valve shaft 5 is supported through the shaft holes located at the lower position of the left-and-right side walls of the intake manifold 2. The valve shaft 5 extends in a direction approximately perpendicular to the intake passage 3. Therefore, the valve 9 integrated with the valve shaft 5 opposes to intake air flowing in the intake passage 3. The valve 9 rotates, and a center of the rotation is the valve shaft 5, which extends perpendicularly to a flowing direction of intake air. The valve 9 is rotated to totally open or close the intake passage 3.

Figure 4C:
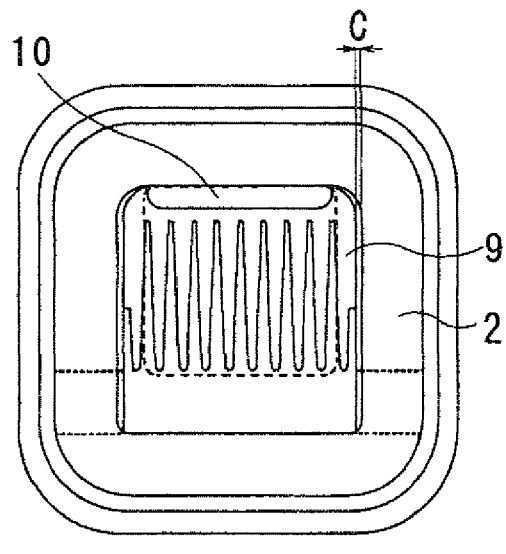
FIG. 4C is an elevation view showing the valve unit.

As shown in FIG. 4C, the valve 9 is a board having an approximately rectangular shape, and an end of the valve 9 has a round part. A center of the round part of the valve 9 is cut so as to be defined as an opening 10. Further, a separation wall having a rib shape is arranged at each end of the opening 10, such that rigidity and strength of the valve 9 can be secured.

When the valve 9 totally closes the intake passage 3, the opening 10 is a main passage in which a tumble flow is generated. The main passage is defined by the valve 9 and the intake manifold 2. Thus, a cross-sectional area of the main passage is contracted. When intake air flowing through the intake passage 3 at an upstream side of the valve 9 passes through the main passage, a main flow B is generated by contracting the intake air with a gained momentum. Thus, air flow to be introduced into the combustion chamber can have the tumble flow. In contrast, when the valve 9 totally opens the intake passage 3, intake air is not contracted so that the tumble flow is not generated. A large amount of air passes through the intake passage 3, which is totally opened.

A left-and-right side end of the valve 9 is defined as a valve side. A side clearance C having a predetermined dimension is defined between the side end of the valve 9 and the side wall of the intake manifold 2. The side clearance C is set to have the predetermined dimension so as to prevent a break of the valve 9, if a thermal deformation is generated by a temperature change. Therefore, intake air flowing at an upstream side of the valve 9 passes through the side clearance C as a bypass flow B when the intake passage 3 is totally closed by the valve 9. Intake air is separated into the main flow M and the bypass flow B at the valve 9 when the intake passage 3 is totally closed by the valve 9. When the bypass flow B is increased, the main flow M is decreased, such that the generation of the tumble flow is decreased. The decreasing of the tumble flow depends on a strength of the main flow M.

Figure 4D:
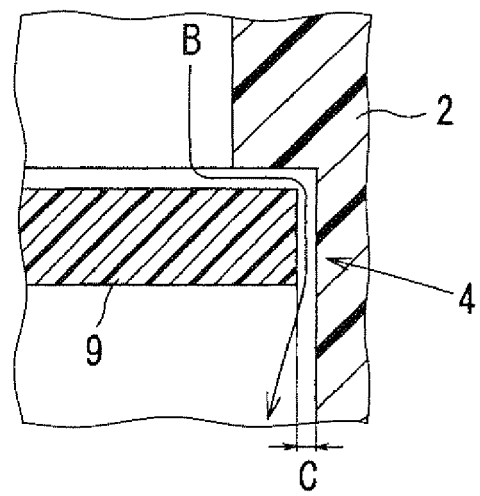
FIG. 4D is an enlarged view of FIG. 4A.
Figure 6:
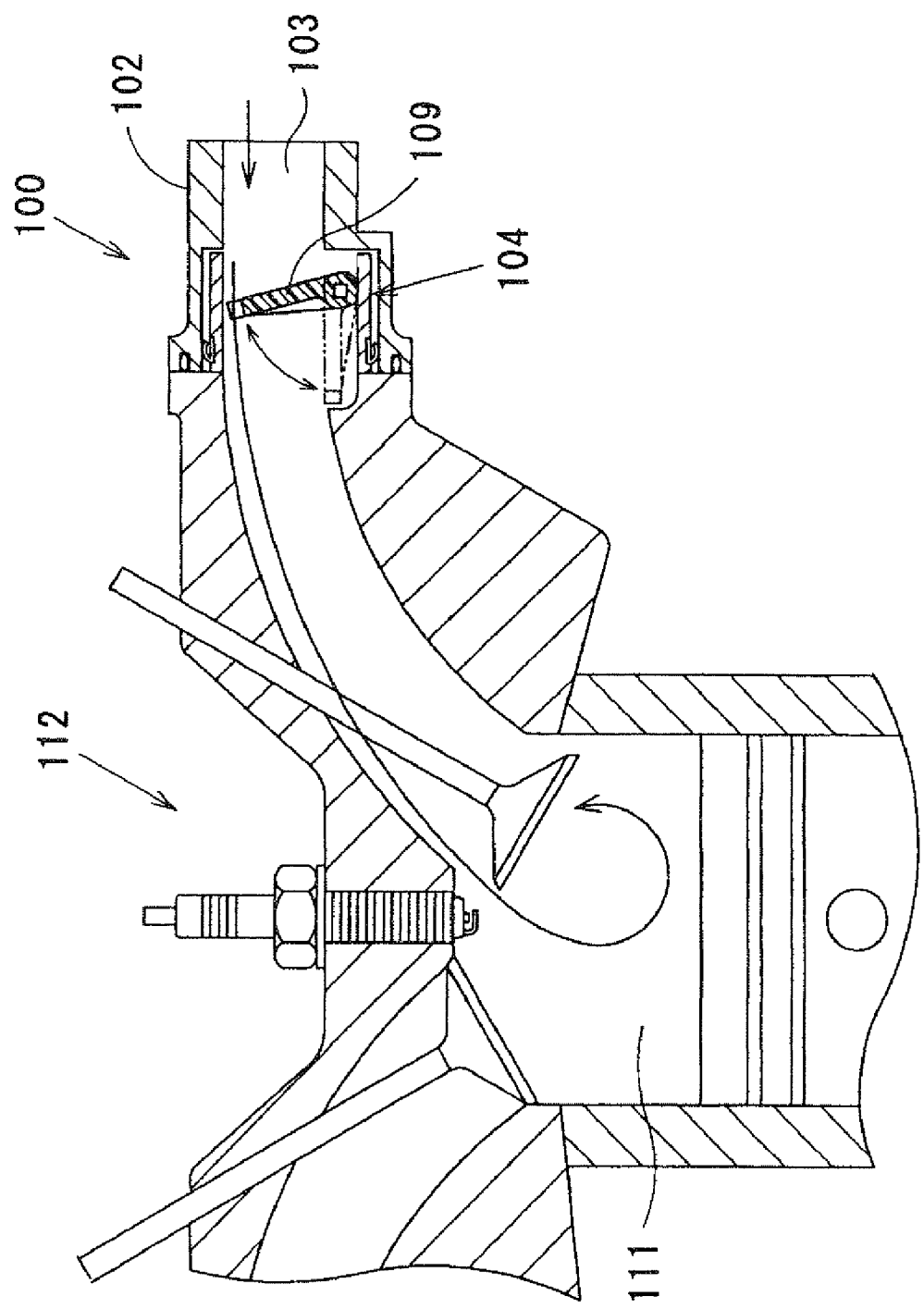
FIG. 6 is a schematic view showing a conventional intake flow control device.
Figure 7A:
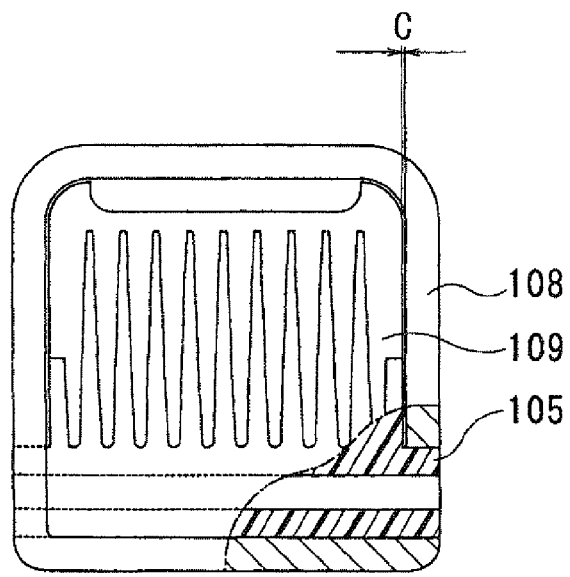
FIG. 7A is an elevation view showing a valve unit of a conventional intake flow control device.
Figure 7B:
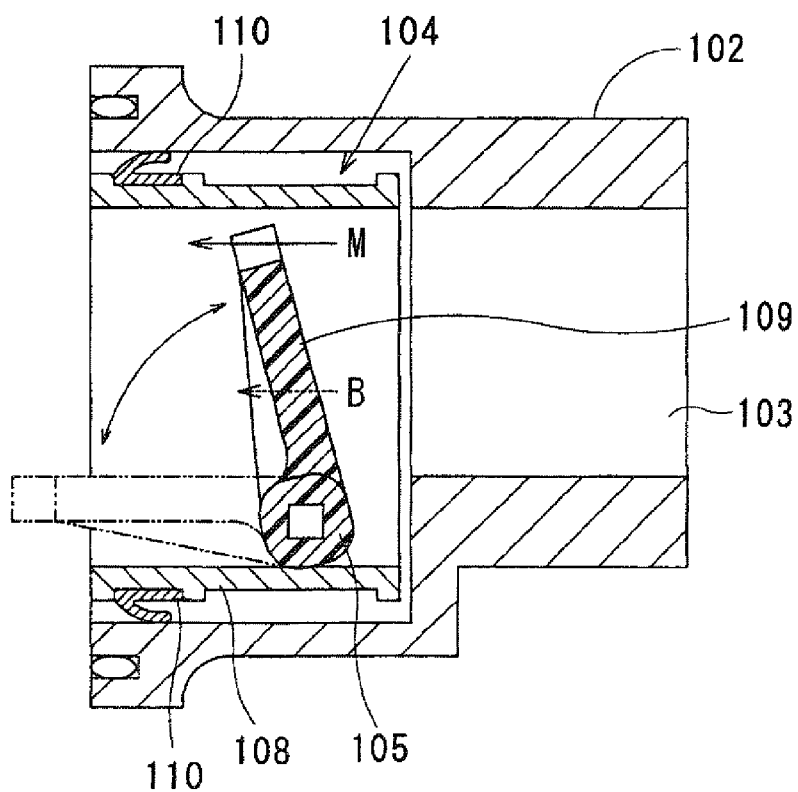
FIG. 7B is a cross-sectional view showing the valve unit.

As shown in FIG. 4D, the side clearance C between the side end of the valve 9 and the intake manifold 2 is made relatively large. A width defined between left-and-right side ends of the valve 9 is made larger than a width defined between left-and-right side walls of the intake manifold 2 located at an upstream side of the valve 9. Here, a size of the side clearance C is determined based on a maximum thermal deformation amount due to a temperature difference, a maximum time-lapse deposit adherence amount, and an appropriate additional clearance. That is, the size of the side clearance C is rationally set by combining the maximum thermal deformation amount and the maximum time-lapse deposit adherence amount and adding the appropriate additional clearance.

Thus, as shown in an arrow direction of FIG. 4D, when the valve 9 totally closes the intake passage 3, the bypass flow B turns with a right angle around the valve 9. Then, the bypass flow B passes through a clearance between the valve 9 and the intake manifold 2, which are contact with or adjacent to each other. Then, the bypass flow B again turns with a right angle to pass through the side clearance C between the valve 9 and the housing 8. Thus, the bypass flow B reaches the downstream side of the valve unit 4, as shown in an arrow direction of FIG. 4D.

According to the second embodiment, the intake flow control device 1 includes a plurality of valve units 4 to change intake flow. The valve unit 4 includes the valve shaft 5 supported between left-and-right side walls of the intake passage 3 of the intake manifold 2, and the valve 9 mounted to the valve shaft 5 so as to open or close the intake passage 3. The intake flow control device 1 further includes the drive shaft 6 connecting the valve shafts 5 of the valve units 4 so as to rotatably drive the valve shaft 5, and an actuator 7 directly connected to the drive shaft 6 so as to drive the valve units 4 to open or close. The valve 9 has a width defined between left-and-right side ends of the valve 9, which is larger than a width defined between left-and-right side walls of the intake passage 3 located at an upstream side of the valve 9.

Therefore, when the valve unit 4 is directly mounted to the intake manifold 2 without the housing 8, and when the side clearance C between the valve 9 and the intake manifold 2 is set relatively large, the amount of the bypass flow B is decreased, because the flow loss composed of the turning loss and the friction loss is increased. Accordingly, the amount of the main flow M can be increased, such that the high tumble flow can be easily generated.

Further, when the side clearance C is set relatively large, the break of the valve 9 due to the thermal deformation and the time-lapse deposit adherence can be reduced. Therefore, a floating gasket, a measure for reducing a slapping sound, and an increasing of a torque or size of the actuator 7 are not needed. Accordingly, cost of producing the intake flow control device 1 can be decreased.

The valve 9 of the second embodiment has a constant thickness. The flow loss is increased, because a direction of the bypass flow B twice perpendicularly changed, and because the flow path of the bypass flow B along the side clearance C is made longer.

A first modification of the second embodiment will be described with reference to FIG. 5A. In contrast to the second embodiment, a labyrinth shaped clearance may be formed between the valve 9 and the intake manifold 2 so as to increase the turning loss of the bypass flow B. As shown in FIG. 5A, the side end of the valve 9 has a groove portion 14 having a step shape at the upstream side, and the step face of the intake manifold 2 opposing to the side end of the valve 9 also has a groove portion 14. A periphery portion 15 is defined adjacent to the groove portion 14. The groove portion 14 and the periphery portion 15 correspond to the labyrinth shaped clearance.

The groove portion 14 opposes to the periphery portion 15 through a predetermined clearance alternately between the valve 9 and the intake manifold 2, when the valve 9 is totally closed. That is, the groove portion 14 of the valve 9 opposes to the periphery portion 15 of the intake manifold 2, and the groove portion 14 of the intake manifold 2 opposes to the periphery portion 15 of the valve 9. Thus, the number of the turnings is increased. Thereby, the amount of the bypass flow B can be reduced, because the flow loss is increased by mainly increasing the turning loss. Here, the groove portion 14 opposes to the periphery portion 15 through a predetermined clearance alternately between the valve 9 and the housing 8, in the first embodiment.

Each of the valve 9 and the intake manifold 2 has a single pair of the groove portion 14 and the periphery portion 15 so as to define the labyrinth shaped clearance. However, the labyrinth shaped clearance may be constructed with two pairs of the groove portion 14 and the periphery portion 15. The valve unit 4 of the second embodiment is directly mounted to the intake manifold 2 without the housing 8. Therefore, the side end of the valve 9 can be easily extended in a width direction, and the valve 9 can be accurately mounted to the intake manifold 2. Accordingly, the number of the pairs of the groove portion 14 and the periphery portion 15 can be easily increased to define the labyrinth shaped clearance. Thus, the flow loss can be further increased, such that the amount of the bypass flow B can be further reduced.

A second modification of the second embodiment will be described with reference to FIG. 5B. A depth of each groove portion 14 of the second modification is made deeper than that of the first modification. When the groove portion 14 opposes to the periphery portion 15 between the valve 9 and the intake manifold 2, the flow path of the bypass flow B along the periphery portion 15 is increased. Thus, the friction loss of the flow loss is increased.

A third modification of the second embodiment will be described with reference to FIG. 5C. The labyrinth shaped clearance is constructed with the single pair of the groove portion 14 and the periphery portion 15. Further, the side end of the valve 9 has a rib 16 extending toward the downstream side. When the groove portion 14 opposes to the periphery portion 15 between the valve 9 and the intake manifold 2, the flow path of the bypass flow B along the periphery portion 15 is increased. Further, the flow loss is increased due to the rib 16, because the flow path of the bypass flow B is further increased. Accordingly, the amount of the bypass flow B can be further reduced.

Such changes and modifications are to be understood as being within the scope of the present invention as defined by the appended claims.

What is claimed is:

1. An intake flow control device for an internal combustion engine comprising:
    a plurality of valve units for changing intake flow, the valve unit including
        a tubular housing defining an intake passage therein, wherein the housing is disposed in an intake manifold such that an outer face of the housing is contact with an inner face of the intake manifold,
        a valve shaft supported between side walls of the housing, and
        a valve mounted to the valve shaft so as to open or close the intake passage;
    a drive shaft connecting the valve shafts of the valve units to rotatably drive the valve shaft, the drive shaft extending in a shaft extending direction; and
    an actuator directly connected to the drive shaft so as to drive the valve units to open or close, wherein
    the valve has side clearances on both side ends in the shaft extending direction, each side clearance being defined between a respective said side end of the valve and an inner side wall of the housing in the shaft extending direction, and
    the valve has a width defined between the side ends of the valve in the shaft extending direction, which is larger than a width in the shaft extending direction defined between inner side walls of the intake manifold located at an upstream side of the valve.

2. The intake flow control device according to claim 1, wherein
    each side clearance has a predetermined labyrinth shaped structure, when the intake passage is totally closed by the valve.

3. The intake flow control device according to claim 2, wherein
    the predetermined labyrinth shaped structure has a shape such that a bypass flow flowing through the side clearance at least twice turns with an acute angle, and
    the acute angle is equal to or smaller than 90° relative to a flow line of the bypass flow in a direction of the bypass flow.

4. The intake flow control device according to claim 2, wherein
    the predetermined labyrinth shaped structure has a shape such that the side end of the valve has a rib protruding with a predetermined dimension in the flow line of the bypass flow.

5. The intake flow control device according to claim 2, wherein
    the side end of the valve and the inner side wall of the housing oppose each other at each adjacent face,
    each adjacent face of the side end of the valve and the inner side wall of the housing has at least one pair of a groove portion and a periphery portion in a periphery of the groove portion, and
    the predetermined labyrinth shaped structure has a shape such that the groove portion opposes to the periphery portion through a predetermined clearance alternately between the valve and the housing, when the valve is totally closed.

6. An intake flow control device for an internal combustion engine comprising:
    a plurality of valve units for changing intake flow, the valve unit including
        a valve shaft supported between side walls of an intake passage of an intake manifold, and
        a valve mounted to the valve shaft so as to open or close the intake passage;
    a drive shaft connecting the valve shafts of the valve units so as to rotatably drive the valve shaft, the drive shaft extending in a shaft extending direction; and
    an actuator directly connected to the drive shaft so as to drive the valve units to open or close, wherein
    the valve has side clearances on both side ends in the shaft extending direction, each side clearance being defined between a respective said side end of the valve and an inner side wall of the intake manifold in the shaft extending direction,
    the valve has a width defined between the side ends of the valve in the shaft extending direction, which is larger than a width in the shaft extending direction defined between inner side walls of the intake passage located at an upstream side of the valve.

7. The intake flow control device according to claim 6, wherein
    each side clearance has a predetermined labyrinth shaped structure, when the intake passage is totally closed by the valve.

8. The intake flow control device according to claim 7, wherein
    the predetermined labyrinth shaped structure has a shape such that a bypass flow flowing through the side clearance at least twice turns with an acute angle, and
    the acute angle is equal to or smaller than 90° relative to a flow line of the bypass flow in a direction of the bypass flow.

9. The intake flow control device according to claim 7, wherein
    the predetermined labyrinth shaped structure has a shape such that the side end of the valve has a rib protruding with a predetermined dimension in the flow line of the bypass flow.

10. The intake flow control device according to claim 7, wherein
    the side end of the valve and the inner side wall of the intake manifold oppose each other at each adjacent face,
    each adjacent face of the side end of the valve and the inner side wall of the intake manifold has at least one pair of a groove portion and a periphery portion in a periphery of the groove portion, and
    the predetermined labyrinth shaped structure has a shape such that the groove portion opposes to the periphery portion through a predetermined clearance alternately between the valve and the intake manifold, when the valve is totally closed.

* * * * *